S. W. ADAMS.
Hoe.
No. 52,510.
Patented Feb. 13, 1866
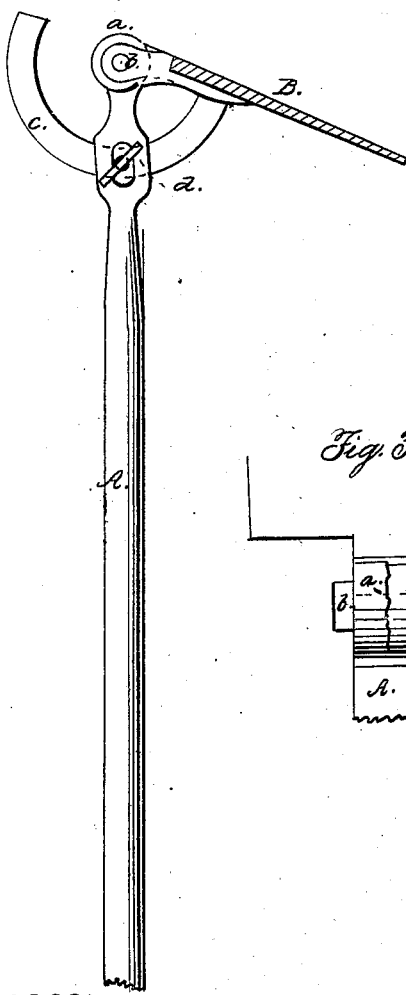
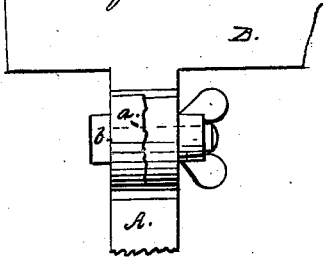
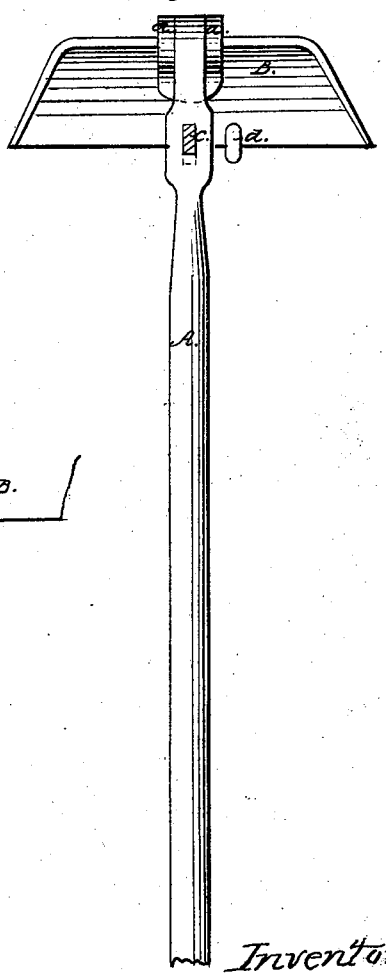
Witnesses:
Inventor:

UNITED STATES PATENT OFFICE.

SHERMAN W. ADAMS, OF WETHERSFIELD, CONNECTICUT.

IMPROVEMENT IN HOES.

Specification forming part of Letters Patent No. 52,510, dated February 13, 1866.

*To all whom it may concern:*

Be it known that I, SHERMAN W. ADAMS, of Wethersfield, in the county of Hartford and State of Connecticut, have invented a new and useful Improvement in Hoes; and I do hereby declare that the following is a full, clear, and exact description thereof, which will enable others skilled in the art to make and use the same, reference being had to the accompanying drawings, forming part of this specification, in which—

Figure 1 represents a side elevation of this invention. Fig. 2 is a rear elevation of the same. Fig. 3 is a modification of the same.

Similar letters of reference indicate like parts.

This invention consists in making the blade of a hoe adjustable, so that it can be set to any desirable angle with the handle, so as to hoe deep or shallow, according to the requirement of the soil or of the crop under cultivation, and that by setting the blade well out from the handle it may be easily ground upon its inner edge, this being the proper edge to be ground, thus obviating the difficulty experienced with common hoes of grinding them upon that edge. Furthermore, by making the hoe adjustable it adapts itself to the stature of the person using it, and by setting the blade properly and reversing the action of the hoe it may be used like a shovel for leveling, grading, &c.

A represents the handle of my hoe, the end of which is fitted between two ears, $a$, projecting from the blade B. A pivot, $b$, connects said handle to the ears, so that the blade is free to swing up and down and to be adjusted to any angle toward the handle.

In order to retain the blade in the desired position, it is provided with a segmental arm, $c$, which forms a part of a circle described from the center of the pivot $b$, and which extends through a mortise in the handle A. A set-screw, $e$, passing through the side of the handle, serves to secure the segmental arm in any desired position, and by these means the blade B can be set to any angle with the handle.

It is obvious that other means might be employed for holding the blade in the desired position besides the segmental arm and set-screw, such, for instance, as shown in Fig. 3, where the end of the handle is provided on its inner surface with radiating grooves, and the adjoining face of the ear projecting from the blade is furnished with corresponding grooves or teeth, so that when the screw is tightened the two surfaces are not liable to slip on each other, and the blade is securely retained in position.

I do not wish to confine myself to any particular method of setting or retaining the hoe in position, but reserve the right to change the same as may be deemed desirable.

What I claim as new, and desire to secure by Letters Patent, is—

The combination of the pivoted blade B, segmental arm $c$, and handle A with devices for securing the said arm at a desired angle of obliquity with the handle, substantially as described.

The above specification of my invention signed by me the 13th day of June, 1865.

SHERMAN W. ADAMS.

Witnesses:
M. M. LIVINGSTON,
W. HAUFF.